Feb. 28, 1928.

T. O'BRIEN 1,660,934

BRUSH ATTACHMENT FOR AUTOMOBILES

Filed May 8, 1926    2 Sheets-Sheet 1

INVENTOR:
Thomas O'Brien.
BY
ATTORNEYS.

Feb. 28, 1928.
T. O'BRIEN
BRUSH ATTACHMENT FOR AUTOMOBILES
Filed May 8, 1926
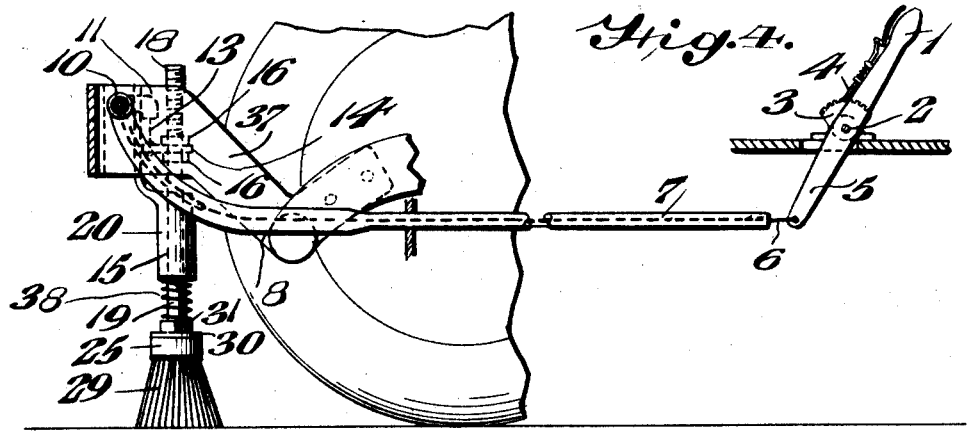
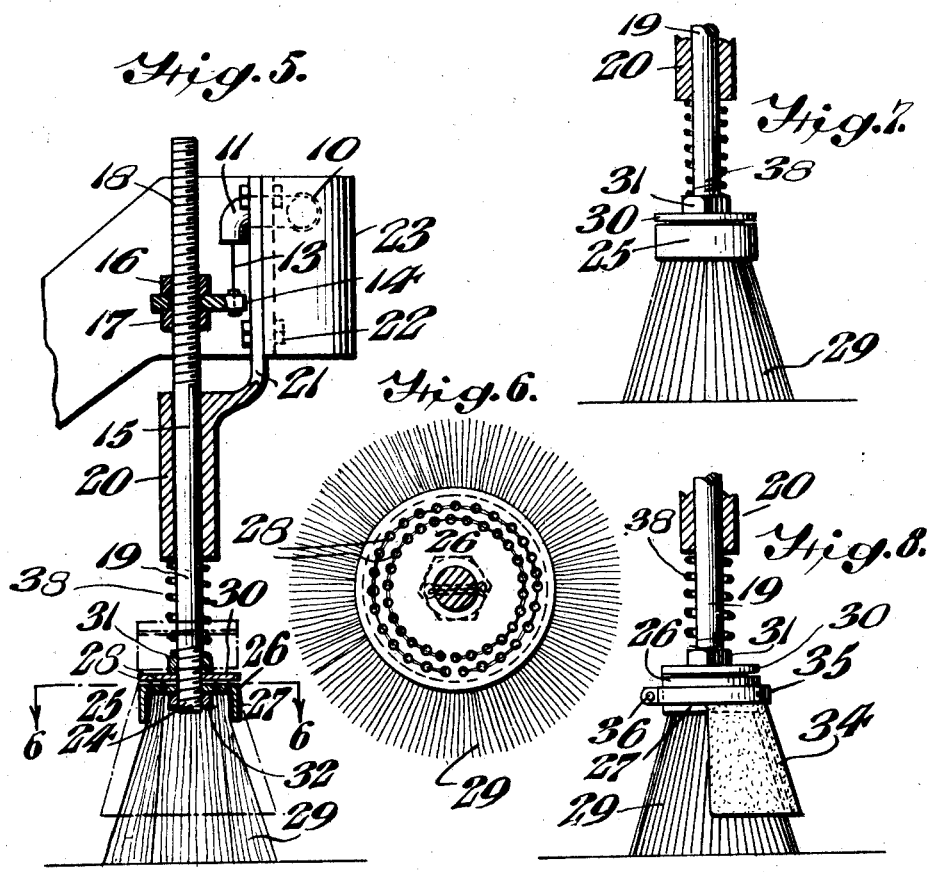

Patented Feb. 28, 1928.

1,660,934

UNITED STATES PATENT OFFICE.

THOMAS O'BRIEN, OF PHILADELPHIA, PENNSYLVANIA.

BRUSH ATTACHMENT FOR AUTOMOBILES.

Application filed May 8, 1926. Serial No. 107,705.

My invention relates to a new and useful brush or sweeping attachment adapted to be used in connection with self propelled vehicles, such as automobiles, trucks and the like, having pneumatic tires, for the purpose of removing from the path of the wheels or tires of such vehicles, broken glass, tacks, nails or any other obstacles or impediments to the safe and easy progress thereof.

My invention relates more particularly, to a brush attachment, which can be readily installed on existing vehicles, whereby a brushing or sweeping element is adjustably and movably supported in spaced relation to and directly in front of each of the two front wheels or tires of a self propelled vehicle, and whereby such brushing or sweeping element is normally held in the operative position, that is, in contact with the surface of the road, by means of gravity or spring actuating means constantly urging the same downwardly, from which lower operative position, said sweeping elements may be lifted or elevated by a suitable control mechanism located on the chassis of the vehicle within easy reach of the driver or chauffeur, without necessitating stopping or slowing down of the vehicle or any interference with its progress.

The leading object of my invention is thus to provide novel means for clearing the path of the wheels of, and removing therefrom, any sharp edged débris, such as broken glass, nails, tacks, splinters and the like, that might be encountered and which would puncture or otherwise damage the tires.

By the provision of a suitable control mechanism, as well as actuating and locking means, it is possible to use my novel sweeping attachment either continously or intermittently at will, as the exigencies of the road may dictate.

With the above ends in views, my invention consists of a pair of brushing or sweeping members of any suitable construction, and size, movably carried upon the front of the vehicle, guiding means to position and maintain said pair of sweeping members directly in front of and in spaced relation to the two front wheels respectively, of said vehicle, means to adjust the height of said brushing or sweeping members with respect to the ground, actuating means normally to retain said sweeping members in their lower operative position, a control mechanism located on the chassis within reach of the driver, whereby said sweeping members may be raised and withdrawn from the normal lower operative position into the upper inoperative position, at will and means to lock said control mechanism in any desired position.

By the employment of a spring actuating means tending constantly to force said sweeping elements downwardly into their lower operative position, that is, into contact with the surface of the road, it is only necessary to raise such sweeping elements against the force of said spring, when it is desired to withdraw the same from the normal operative position. When, on the other hand, it is desired to return the sweeping elements into their lower operative position, it is merely necessary to release the pull exerted by the control mechanism, whereupon the tension of the spring actuating member will at once force said sweeping elements downwardly into their lower operative position, said spring actuating means being omitted if so desired, since the force of gravity will always tend to pull said sweeping elements downwardly into their lower operative position, when the pull exerted upon the same by the control mechanism is released.

For the purpose of illustrating my invention, I have shown in the accompanying drawings, forms thereof which are at present preferred by me since they will give in practice satisfactory and reliable results, although it is to be understood that the various instrumentalities of which my invention consists can be variously arranged and organized and that my invention is not limited to the precise arrangement and organization of these instrumentalities as herein shown and described.

Referring to the drawings,

Figure 4 represents, on an enlarged scale, a side elevation showing the mechanism for raising and lowering the brushes, certain parts being shown in section.

Figure 5 represents a vertical sectional view showing the manner of raising and lowering a brush, certain of the parts being shown in elevation.

Figure 6 represents, on an enlarged scale, a horizontal section on line 6—6 of Figure 5.

Figure 7 represents a side elevation of a detailed view of my invention, the brush guide being shown in section.

Figure 8 represents a side elevation of the brush member showing the shield or guard employed, the top of the guide for the brush member being shown in section.

Figures 1, 2, 3:
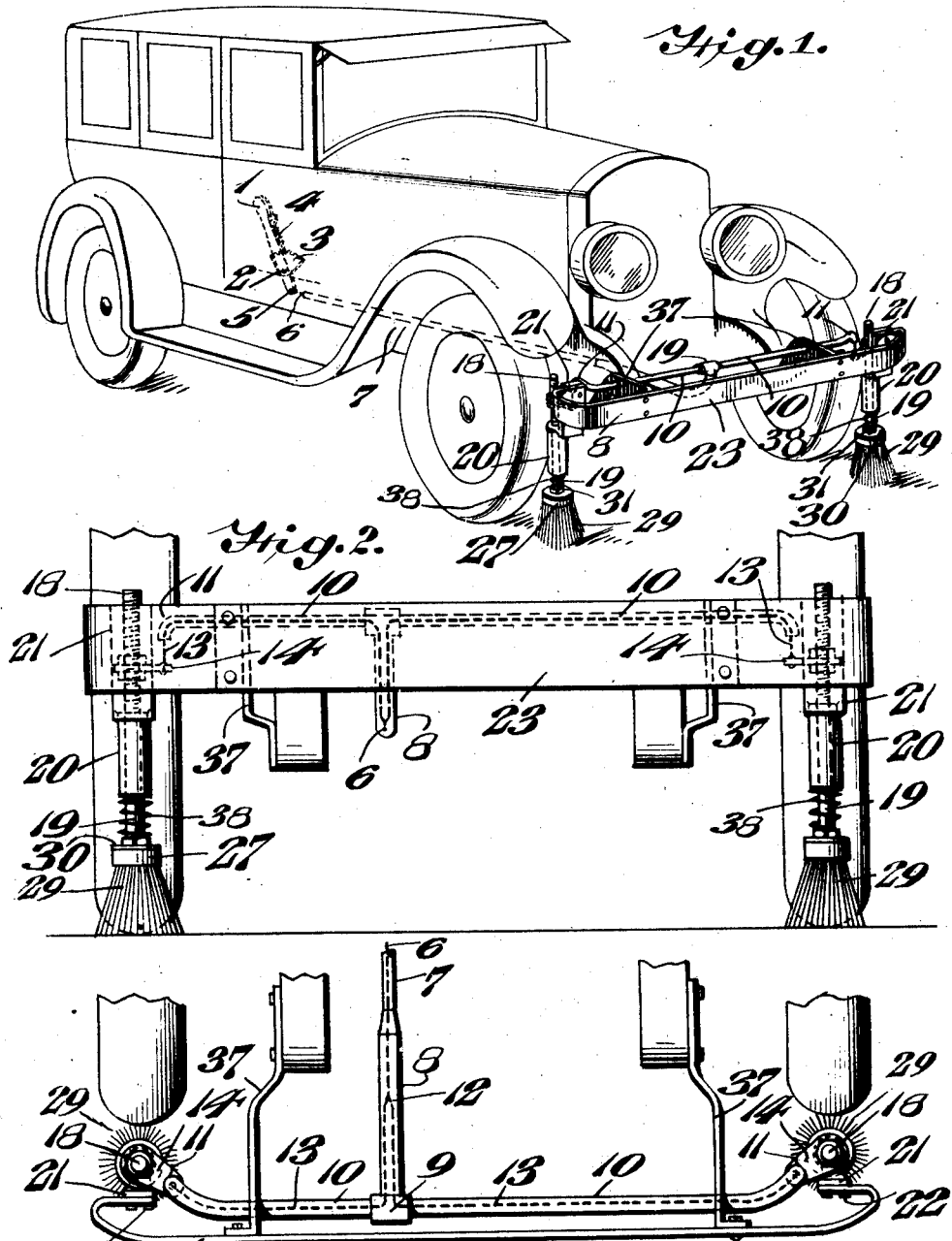
Figure 1 represents a perspective view of a brush attachment for automobiles, embodying my invention, showing the manner of applying the same to an automobile.
Figure 2 represents, on an enlarged scale, a front elevation of Figure 1.
Figure 3 represents a top plan view of Figure 2.

Referring to the drawings, in which like reference characters indicate like parts, 1 designates a lever, mounted upon a suitable point of the automobile body or chassis, which lever 1 is fulcrumed at the point 2 and provided with the stationary ratchet 3, and carries the spring pressed pawl 4, whereby said lever can be adjusted or locked in any desired position.

To the lower end 5 of the lever 1, is attached one end of a cable 6 which passes through a tube 7 whose front portion is enlarged as indicated at 8 and terminates in a T 9, from which extends at a right angle the two tubular members 10, which terminate in the downwardly turned elbows 11. At the point 12 (see Figure 3), the cable 6 is divided into two members 13, which are continued through the tubular sections 10, and thence down through the elbows 11, so that the lower ends of the cable members 13 are attached to the bars 14 each of which has a hole therein, through which passes the brush carrying rod 15, the bar 14 being held in the desired adjusted position by the manipulation of the upper and lower lock nuts 16 and 17.

The upper portion of the rod 15 is threaded as indicated at 18, while its portion 19 which is smooth and unthreaded, passes freely through the bearing 20 of the bracket 21 which is secured by the bolts 22 to a suitable portion of the fender 23, which is supported from the front of the automobile in any usual or conventional manner.

The lower end of the rod 15 is threaded, as indicated at 24, and passes through the brush holder 25, which is composed of the plate 26 having the pendant annular flange 27. The plate 26 is provided with the concentric rows of holes 28 through which the brush members 29 pass, said brushes being preferably made of wire and being formed in U-shape and then passed through a pair of holes 28 in said plate 26, where after being bent, they are passed through said holes 28 and secured in position by the disc 30 above which is the lock nut 31. 32 designates a lock nut on the bottom of the threaded portion 24, so that it will be apparent that when the lock nuts 31 and 32 are tightened, the wires or bristles composing the brush will be rigidly held in the desired position, and the brush members will appear as shown.

38 designates a spring interposed between the lower end of the bearing 20 and the top plate 30 of the brush member and coiled around the portion 19 of the rod 15, which spring 38 exerts a constant downward pressure on said brush member, thus tending to force the same downwardly into contact with the road.

In Figure 4, I have shown my novel sweeping attachment in the operative position thereof, with the control mechanism or operating lever 1 thrown back and the brush members in their operative lower position, in contact with the road. When it is desired to raise the brush members, that is, to withdraw the same from engagement with the road, it is only necessary to move the lever 1 forwardly, thus moving the lower end 5 of the lever backwardly thereby exerting a pull on the cable 6, thereby raising the pendant brush members and withdrawing the same from their lower operative position into their upper inoperative position, against the tension of the spring 38. When it is desired to return the brush members into their operative position, it is merely necessary to allow the lever 1 to move back into the position best seen in Figure 4, thus releasing the pull on the cable 6, whereupon the tension of the spring 38 will at once force the brush members downwardly into their operating position in contact with the road.

By providing the lock nuts 16 and 17 and the bar 14 through which passes the upper threaded portion 18 of the rod 15, I can prolong the life of the brushes and render the use of my sweeping attachment very economical, since it is thus possible to use each brush, until the bristles thereof are nearly worn out. Thus, after the brush has been in use for some time and the bristles thereof have become relatively short, it is only necessary to readjust the height of the rod 15 whereupon the brush members can be used for another period of time, when another adjustment can be made, and so on until the bristles are completely worn out, thus getting a maximum amount of service from such brush members with very little trouble or effort and with but an occasional adjustment.

The bearing 20 carried by the bracket 21 and rigidly and permanently secured to the fender, serves to guide the rod 15, and therefore the brush members carried thereby, so that the latter are positioned and maintained directly in front of the respective wheels or tires of the vehicle, at all times.

In case it is desired to conceal a portion of the brush, a guard 34 of any suitable stiff material may be employed which guard member 34 is suspended from the ring or clamp 35, which is secured by a suitable screw 36, as will be apparent from Figure 8.

I have deemed it unnecessary to describe the bumper 23 in detail, or its manner of attachment to the front of the chassis, but in the present instance I preferably secure the fender to the front of the automobile by the arms 37 through which the tubular sections 10 pass and are thereby supported.

It will now be apparent that I have devised a novel and useful construction of brush attachment for automobiles which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention what I claim as new and desire to secure by Letters Patent, is:—

1. In a device of the character stated, a longitudinally extending tubular member, a front transverse tubular member connected therewith, said tubular members being adapted for installation upon a vehicle, brackets having vertically disposed bearings, rods carrying brushes at their lower ends, and vertically movable in said bearings, a cable positioned in said tubular members and connected to said rods, and means for actuating said cable, rods and brushes to raise and lower the latter.

2. In a device of the character stated, a front transverse tubular member adapted for installation upon a vehicle having front wheels, brackets having vertically disposed bearings, rods threaded at their upper ends and carrying brushes at their lower ends, and vertically movable in said bearings, bars in threaded engagement with the upper ends of said rods, a cable connected to said bars, means including a hand lever for actuating said cable, rods and brushes to raise and lower the latter, and springs interposed between the lower ends of said brackets and the tops of said brushes for normally forcing the latter downwardly, said brushes being positioned in advance of the front wheels of said vehicle.

3. In a sweeping attachment of the character stated, an automobile having wheels thereon, an operating lever on said automobile, means cooperating with said operating lever to lock the same in any desired position, transverse tubular members supported on said automobile, a pendant sweeping element positioned near the outer ends of each of said transverse tubular members respectively, and in front of the two front wheels, means to adjust the vertical height of said sweeping elements with respect to the road surface, connections from said lever to said sweeping elements to retain the latter in their normal operative position and to elevate said sweeping elements from the operative into inoperative position, and means to lock said operating lever in any desired position.

THOMAS O'BRIEN.